Patented May 13, 1941

2,241,790

UNITED STATES PATENT OFFICE 2,241,790

CLEANSING COMPOSITION

Ernest Wayne Rembert, Plainfield, N. J., assignor to Johns-Manville Corporation, New York, N. Y., a corporation of New York No Drawing. Application December 23, 1937, Serial No. 181,323

2 Claims. (Cl. 252—142)

This invention relates to a cleansing composition and the method of cleaning articles therewith.

It is intended to solve the difficulty heretofore experienced in removing satisfactorily dirt, soot, rust or like stains from cementitious articles and, particularly, in cleaning asbestos-cement sheets.

Because the invention is particularly adapted for cleaning asbestos-cement shingles or siding units, it will be described in detail with reference thereto.

Such asbestos-cement sheets that are to be cleaned, after exposure to weather or other conditions causing stain, may be those made in conventional manner. Thus, they may be siding units or shingles made by forming a wet sheet of intermingled asbestos fibres and Portland cement, strongly compressing the wet sheet in a hydraulic press, to remove excess water and to densify and consolidate the sheet, and then hardening it.

Among such units so made and that may be cleaned in accordance with the present invention, are the grained siding units having, when fresh, a grey to white color. It will be understood, however, that sheets of other color that is not adversely affected by and/or of somewhat varied composition may be cleaned with my improved composition, so long as the sheets are cementitious, that is, contain a binder that is essentially calcareous and that is appreciably soluble in dilute acid of the kind to be described. Among such cementitious materials are Portland cement, high calcium aluminate (Lumnite) cement, and lime and silica binder, such, for instance, as common mortar.

For best results, the cleansing composition used should contain the following ingredients:

(1) An acid.
(2) A wetting agent.
(3) A foaming agent.
(4) A flotation agent.
(5) Water.

The acid used should be approximately as strong at least as acetic acid, as indicated by degree of ionization at equal concentration or by having appreciable solvent power for the cementitious articles to be cleaned. Acetic acid itself is very satisfactory. However, I may use phosphoric or a stronger acid. In general, the acid should be one that is adapted to react with calcium carbonate and, to some extent, calcium silicate, when the latter has been formed by wet methods and without calcination. Also, it should be one adapted, in the presence of the said agents to dissolve iron stains without the formation of a highly colored insoluble product. Inexpensive acids that may be used and that meet these general qualifications include hydrochloric acid, nitric acid, and the like, in addition to acetic and phosphoric acids.

The acid, as used, should be diluted with a large volume of water, as will be explained later.

Phosphoric acid is not a preferred acid for use when the article being cleaned contains a very large amount of readily soluble lime compounds that, by reacting with the phosphoric acid and forming a large amount of calcium phosphate, would produce a conspicuous precipitate of the said phosphate. While any of the acids mentioned may be used with asbestos and Portland cement products which have been made with admixed silica and steam cured, to cause combination between the said silica and most of the lime formed during hydration of the cement, phosphoric acid is not recommended for asbestos-cement products which are made without the admixed silica and the steam curing.

The wetting, foaming, and flotation agents must be substantially non-reactive with the acid, that is, should be adapted to preserve their properties as wetting, foaming and flotation agents, respectively, in the presence of the acid.

There are certain additional requirements for the said agents.

The wetting agent is one that promotes penetration of the aqueous cleansing composition into the article to be cleaned and causes spreading of it around the dirt particles or the like that are to be removed. It is one that functions well in an acid medium. Among wetting agents that meet these general properties are the alkylated naphthalene sulfonic acids. Thus, there may be used the ethyl-, the isopropyl-, or a butyl-naphthalene sulfonic acid. I have used, to particular advantage, iso-propyl-naphthalene sulfonic acid in an acid solution and having, as mixed with the remainder of the cleansing composition, a pH value of from 1 to 2. Another wetting agent that meets the general requirements stated is a like derivative that has been neutralized during manufacture. Such a derivative that is, the neutralized isopropyl naphthaline sulfonic acid is known as "Neomerpin." Another alkylated naphthalene sulfonic acid that may be used is "Nekal." Another wetting agent that may be used is a derivative of taurine that is, an oleic acid ester of a sulfonated aliphatic compound, known by the name of "Igepon T."

The foaming agent is one that is not destroyed in its effectiveness by the acid in the cleansing composition and that promotes the emulsification of gas bubbles in the cleansing composition. The foaming agent should be one which decreases the surface energy at the interface between a bubble of air or the like and the surrounding liquid medium. One such foaming agent is the sodium salt of sulfonated abietine. Another is the potassium salt of sulfonated commercial rosin.

The flotation agent selected is one that, in the presence of the acid of the cleansing composition, promotes the suspension of dirt, soot, rust, or the like in the interface between emulsified gas and the surrounding liquid medium, so that floating away of the stain is facilitated. One of the agents which meets the general properties recited is the sodium salt of normal octyl sulphate. Other such agents that may be used are alkali metal salts of sulfates of other higher normal alcohols containing, suitably 7 to 9 carbon atoms to the molecule.

Various proportions of the several active ingredients in the aqueous mixture may be used. Economy favors the use of relatively small proportions, whereas quicker action in the cleansing operation is favored by somewhat higher proportions. I have found satisfactory, from the standpoint of both cost and speed of action, proportions by weight in the following ranges.

| | Parts |
|---|---|
| Acid | 2 to 7 |
| Wetting agent | 0.25 to 4 |
| Foaming agent | 0.1 to 1 |
| Flotation agent | 0.1 to 1 |
| Water, as required | |

The acid is preferably diluted with the water before the said agents are added. Then the several agents are added and the whole is agitated, to give an intimate mixture.

The amount of water used will depend upon the dilution desired. Ordinarily, I make and ship a composition that is fairly concentrated, say, one that contains about half its weight of water. This may be diluted at the time of application to the asbestos and cement or like sheets to be cleaned, as, for example, to a content of about 85 to 95 parts of water to 100 parts total weight of the cleansing mixture. Thus, I have used to advantage a cleansing composition, diluted for use, that contains approximately 5% by weight of the acid, 0.5% of the wetting agent, and 0.25% of each of the foaming and flotation agents, the remainder being water.

The composition is applied to the article to be cleaned in such manner as to cause emulsification of gas bubbles, the bubbles being constituted of gas generated by the reaction of the cleansing composition upon the article being cleaned and/or by air which becomes mixed into the cleansing composition during its use. Thus, the cleansing composition may be sprayed through air upon the roof or side of a building that is to be cleaned or may be applied thereagainst by a vigorous brushing action.

During use, the wetting agent causes the desired penetration and spreading of the cleanser composition. The foaming agent promotes the emulsification of bubbles of gas. The flotation agent causes the staining material that is to be removed to become concentrated at the interfaces between the emulsified gas bubbles and the surrounding liquid medium, so that its removal is facilitated.

The method described produces emulsification of gas in the film of cleanser applied to the surface to be cleaned.

The surface being cleaned is finally washed with water, applied by a hose or other convenient means. The result is a thorough cleansing of the surface.

While the whole composition described is particularly successful, any one of the said agents (wetting, foaming or flotation) may be omitted when certain types of stains only are to be removed or when a thorough and quick cleansing is not essential.

The details given are for the purpose of illustration, not restriction, and variations within the spirit of the invention are intended to be included in the scope of the appended claims.

What I claim is:

1. An aqueous acid cleansing composition for cementitious articles containing calcareous materials consisting essentially of an intimate mixture of water, an acid having an ionization substantially equal to the ionization of acetic acid at equal concentrations and reactive with the calcareous materials of the article, an alkylated naphthalene sulphonic acid as a wetting agent, an alkali metal salt of sulphonated abietine as a foaming agent, an alkali metal salt of a sulphate of a higher normal alcohol as a flotation agent, the said agents being adapted to preserve their wetting, foaming and flotation properties, respectively, in the presence of the acid.

2. An aqueous acid cleansing composition for cementitious articles containing calcareous materials consisting essentially of an intimate mixture of water, an acid having an ionization substantially equal to the ionization of acetic acid at equal concentrations and reactive with the calcareous materials of the article, an alkylated naphthalene sulphonic acid, an alkali metal salt of sulphonated abietine and an alkali metal salt of a sulphate of a higher normal alcohol, said ingredients being present in the cleansing composition in the following proportions:

| | Parts by weight |
|---|---|
| Acid | 2 to 7 |
| Alkylated naphthalene sulphonic acid | .25 to 4 |
| Alkali metal salt of sulphonated abietine | .1 to 1 |
| Alkali metal salt of a sulphate of a higher normal alcohol | .1 to 1 |
| Water, as required to dilute the mixture. | |

ERNEST WAYNE REMBERT.